United States Patent

[11] 3,617,585

| [72] | Inventors | Paul A. Haas<br>Knoxville;<br>Sam D. Clinton, Oak Ridge, both of Tenn. |
|---|---|---|
| [21] | Appl. No. | 860,281 |
| [22] | Filed | Sept. 23, 1969 |
| [45] | Patented | Nov. 2, 1971 |
| [73] | Assignee | The United States of America as represented by the United States Atomic Energy Commission |

[54] METHOD FOR PREPARING OXIDE GEL MICROSPHERES FROM SOLS
4 Claims, 3 Drawing Figs.

[52] U.S. Cl. .................................................. 264/0.5,
23/355, 23/183, 252/301.1 S, 264/14
[51] Int. Cl. .................................................. G21c 21/00
[50] Field of Search .......................................... 264/0.5, 14;
252/301.1 R, 301.1 S; 23/355, 183

[56] References Cited
UNITED STATES PATENTS
3,290,122  12/1966  Clinton et al. ............... 23/355 X

| 3,329,745 | 7/1967 | La Grange .................. | 264/0.5 |
| 3,331,898 | 7/1967 | Haas et al. .................. | 264/0.5 |
| 3,340,567 | 9/1967 | Flack et al. .................. | 264/0.5 UX |
| 3,355,525 | 11/1967 | Smith et al. .................. | 264/0.5 |
| 3,384,687 | 5/1968 | Flack et al. .................. | 23/355 X |

Primary Examiner—Carl D. Quarforth
Assistant Examiner—S. R. Hellman
Attorney—Roland A. Anderson ABSTRACT: A process for the production of gel microspheres characterized by a mean sphere diameter in the range of about 5 to 300 microns and a comparatively small proportion of spheres with diameters much smaller than the mean sphere diameter. A fine stream of a hydrous sol is introduced to a dehydrating stream of organic liquid through a capillary extending into the organic stream at an angle thereto. The flow rate of the organic stream is maintained at a value establishing a selected agitated flow condition at tee capillary outlet, thereby producing a sol drop dispersion yielding gel microspheres of the character desired.

INVENTORS.
Paul A. Haas
Sam D. Clinton
ATTORNEY.

INVENTORS.
Paul A. Haas
Sam D. Clinton 3,617,585

METHOD FOR PREPARING OXIDE GEL MICROSPHERES FROM SOLS

FIELD OF THE INVENTION

This invention relates to a process for the production of metal oxide microspheres from aqueous sols. The invention was made in the course of, or under, a contract with the U.S. Atomic Energy Commission.

BACKGROUND OF THE INVENTION

In recent years the sol-gel process has been investigated intensively as a means of preparing high-density oxide microspheres for nuclear reactor fuel applications. Generally, the process has comprised preparing an oxide of a fertile and/or fissionable element in the form of an aqueous sol; dispersing very small droplets of the sol in a dehydrating liquid to form gel microspheres of a desired diameter; and subsequently firing the gel microspheres to a high density. The mean diameter and the particle size distribution of the dispersed sol droplets have a controlling effect on the mean diameter and particle size distribution of the fired microspheres. Thus, where product specifications call for a highly uniform product of a given mean diameter, the controllability of the sol dispersion is of critical importance.

Certain proposed nuclear reactor fuels—such as the so-called Sphere-Pac fuel—call for the use of a fuel bed which is formed by combining two or more batches of calcined oxide microspheres, each batch being characterized by a different mean sphere diameter. It is desired that one of these batches have a mean diameter in the range of 10 to 50 microns and a relatively small weight percentage of "fines" (spheres having diameters which are much smaller than the mean diameter). Application of the sol-gel process to the production of such microspheres imposed the need for a reliable, large-scale method for producing sol-drop dispersions having the following combination of properties: (1) a mean drop diameter in the range of about 20 to 200 microns, and (2 2) a comparatively small proportion of drops with diameters much smaller than the mean diameter. The sol-dispersion methods of the prior art have not been found suitable for this purpose.

Referring to prior art methods for dispersing sols, the paddle-agitator method can be used to produce dispersions having mean diameters in the above-cited range but the dispersions also include an undesirably large proportion of extremely small droplets. The vibrating plate-nozzle technique does not produce sol droplets having a mean diameter in the desired range. The laminar-flow varicose mechanism described in our U.S. Pat. No. 3,290,112 is limited to very low production rates for dispersions having a mean sol-drop diameter below about 200 microns. The production of sol dispersions by establishing shearing between a stream of sol and a laminar stream or stagnant volume of dehydrating liquid is disclosed in our U.S. Pat. No. 3,331,898. The method, however, is not well suited to producing uniform sol dispersions yielding gel microspheres having a diameter below 200 microns, as is pointed out in column 3 (lines 58–60) of that patent.

It is, accordingly, an object of this invention to provide an improved method for the production of gel microsphere products characterized by a small mean diameter and a comparatively low proportion of microspheres with diameters much smaller than the mean diameter. It is another object to provide a method whereby said gel microspheres can be produced continuously and one a relatively large scale. It is still another object to provide a method wherein the mean diameter of said gel microspheres can be easily controlled.

SUMMARY OF THE INVENTION

In accordance with this invention gel microspheres characterized by a mean sphere diameter in the range of about 5 to 330 microns are formed from a hydrous oxide sol by introducing a fine stream of said sol into a dehydrating stream of organic liquid. The sol stream is introduced at a flow rate in the range of about 1 to 35 cc./min. through an inlet capillary which extends part way into the organic stream at an angle to the direction of flow thereof. The flow rate of the angle to the direction of flow thereof. The organic stream is impinged on the capillary at a flow rate in the range of about 200 to 2,500 cc./min. to promote agitated flow of the organic stream in the region of the capillary, thereby dispersing the introduced sol in the form of the desired dispersion.

DESCRIPTION OF THE PREFERRED EMBODIMENT

Figure 1:
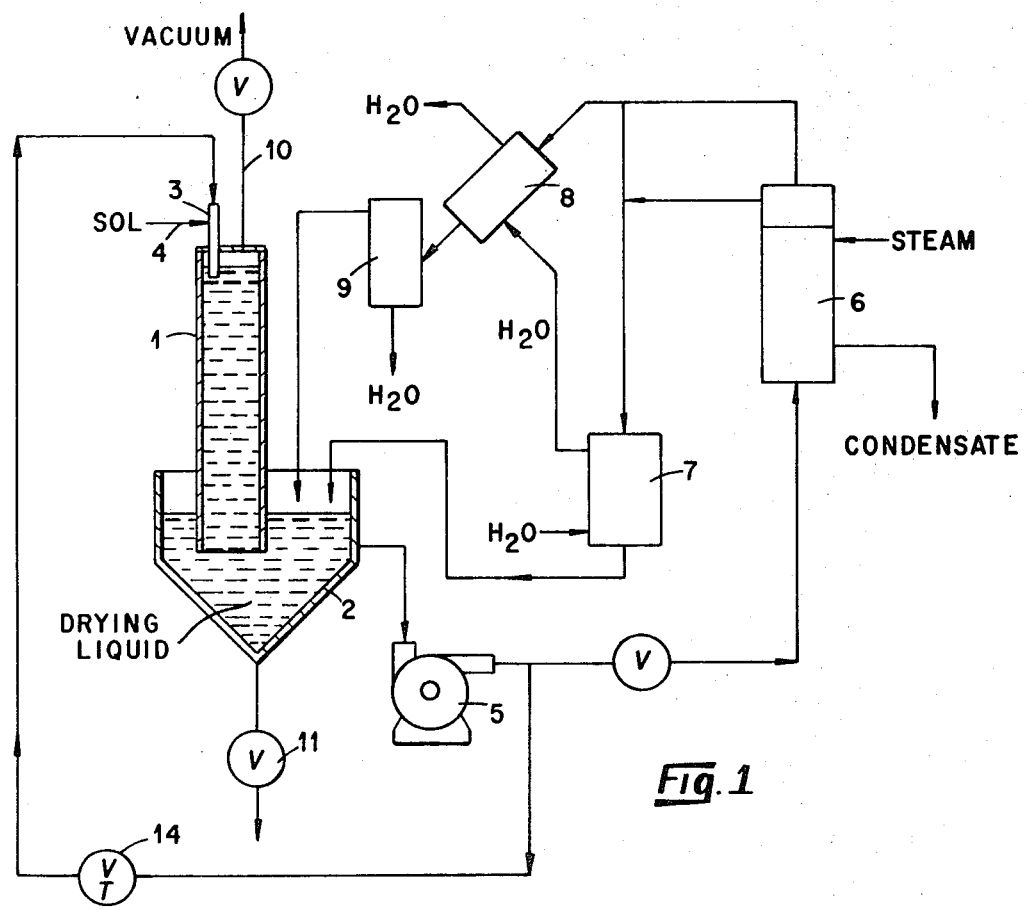
FIG. 1 is schematic diagram of a system for producing gel microspheres in accordance with this invention.
Figure 2:
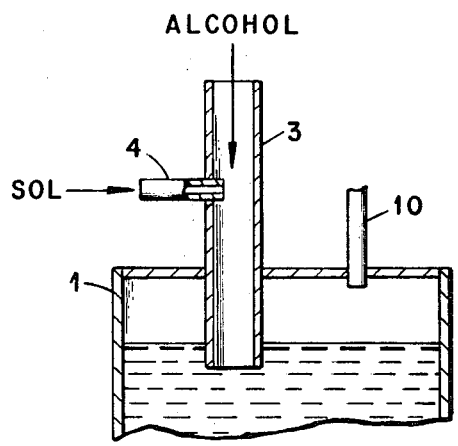
FIG. 2 is an enlarged detail view of a sol-dispersing arrangement shown in FIG. 1.

In the system shown in FIGS. 1 and 2, a hydrous oxide sol (e.g., 0.7 M $UO_2$ sol) is introduced into a stream of organic dehydrating liquid (e.g., isoamyl alcohol) to form a dispersion of sol droplets within a volume of the dehydrating liquid. The sol droplets are congealed to gel microspheres which subsequently are recovered for calcination to high-density oxide microspheres.

The system shown in the FIGS. includes a vertical column 1 whose upper end is closed and whose lower end opens into a conical settler-surge tank 2 provided with a valved drain line 11. A vertically disposed tubular nozzle 3 is passed through the top of the column to extend within the top portion thereof. In the preferred form of this invention a capillary 4 is passed through the wall of the nozzle to extend part way therein at essentially a right angle to the major axis of the nozzle. The external end of the capillary is connected to a supply of hydrous oxide sol (not shown). For the production of highly uniform sol dispersions having mean diameters in the range of 5 to 300 microns, good results can be obtained with a nozzle having an internal diameter in the range of from 0.06 inches to 0.20 inches, and a capillary 4 having an internal diameter in the range of 0.010 inches to 0.040 inches.

As shown, the external end of the nozzle 3 is connected through an adjustable valve 14 to the discharge of any suitable pump 5 for recirculating the dehydrating liquid. Also connected to the discharge of the pump is a network including heat exchangers 6, 7, 8 and a phase separator 9. The intake of the pump 5 is connected into the upper portion of the tank 2. As indicated in FIG. 1, a line 10 connects the top portion of the column 1 to a vacuum system (not shown).

Prior to a typical operation of the system shown, an organic dehydrating liquid is admitted to the tank 2, and the column 1 is evacuated through line 10 so that the liquid fills the column to a point above the discharge end of the nozzle 3. The pump 5 then is energized to withdraw organic liquid from the tank 2 and circulate it through the nozzle 3 at a selected constant flow rate ensuring agitated (nonlaminar) flow at the outlet of the capillary. Hydrous oxide sol at a selected molarity is introduced through the capillary 4 at a selected constant flow rate. For the production of highly uniform sol dispersions having mean diameters in the range of 5 to 300 microns, the flow rate of the organic liquid typically is in the range of 200 to 2,500 cc./min., whereas that of the sol is in the range of 1 to 35 cc./min.

The sol issuing from the capillary 4 is a well-defined stream of fixed cross section. As this stream enters the stream of organic liquid the sol is broken up into minute spherical drops primarily by the agitated flow of the organic liquid in the region of the capillary and, to a lesser extent, by the shearing action of the organic liquid. Even at organic flow rates characterized by Reynolds numbers as low as 500, the capillary body disturbs the organic stream sufficiently to promote dispersion by localized agitation. The dispersed sol is discharged from the nozzle into the upper portion of the column 1, where the organic liquid extracts water from the sol droplets, gradually congealing and densifying them to gel microspheres. The column 1 is made sufficiently long to permit substantially complete gelation of the spheres. As the drops congeal, they shrink and densify, with the result that they gradually settle into the tank 2. The microspheres may be permitted to accumulate in tank 2; alternatively, the valve 11 may be left open and the product accumulated in any suitable collector (not shown). Subsequently, the microspheres are recovered from the organic liquid by any suitable technique, such as filtering. The recovered microspheres are dried and then fired to increase their density.

The system shown in FIG. 1 is designed for continuous operation, a small fraction of the organic liquid discharged from the pump 5 directed through the above-mentioned network for removal of extracted water and then returned to the tank 2. Removal of the water is being accomplished by a single stage distillation at a temperature selected to remove a large fraction of the water and a small fraction of the organic liquid as vapor (typically about 120° C. for isoamyl alcohol or 150° C. for 2-ethyl-1-hexanol). The vapor is condensed and wet organic liquid is returned to the tank 2 whereas water saturated with organic is discharged to waste.

Our U.S. Pat. No. 3,290,122 describes generally the nature of the organic liquids suitable for the gelation of aqueous sol dispersions. The dehydrating liquids described therein may be used in the present process. We have now discovered, however, that isoamyl alcohol is especially suitable as the dehydration medium for sol dispersions having mean drop diameters below about 100 microns. In such application, isoamyl alcohol even without a surfactant additive permits the use of nonfluidized gelling columns. Appreciably shorter columns can be used than would be required if, say, 2-ethyl-1-hexanol (2EH) were used as the gelling liquid. Furthermore, the lower viscosity and the lower alcohol-to-sol volume allowable for the water solubility (9 percent for isoamyl alcohol, compared to 2.5 percent for 2EH simplify separation of the gel microspheres from the organic liquid. Again, the isoamyl alcohol has a lower boiling point and thus it may be regenerated more readily by distillation. Whether or not isoamyl alcohol is used as the organic fluid, the subject method may, if desired, be conducted with the congealing sol drops being maintained in suspension by fluidization techniques, such as those described in U.S. Pat. No. 3,290,122.

The following three examples illustrate the subject matter as conducted in a system of the kind illustrated in FIGS. 1 and 2. As will be described, some of the process variables differed for the various examples. In all three, however, the column 1 had an internal diameter of 3.5 inches and a length of 36 inches; the capillary 4 had an internal diameter of 0.026 inch and was positioned at an angle of essentially 90° to the axis of the nozzle 3; and the drying liquid was isoamyl alcohol (which in example III contained surfactants).

EXAMPLE I

In this run (which corresponds to run No. 14 of Table I) the nozzle 3 comprised a glass tube 0.104 inch in internal diameter, with a No. 20 hypodermic needle passed through the wall of the tube to extend 0.03 inch therein. Isoamyl alcohol containing no surfactant and having a viscosity of 2.7 centipoise was passed along the axis of the nozzle at a flow rate of 550 cc./min. Uranium dioxide sol (1.06 M U) was introduced through the needle (capillary) at a flow rate of 9.8 cc./min. The alcohol Reynolds number in the region upstream of the discharge end of the needle was 1,320. The introduced sol stream was dispersed primarily by localized, or promoted, agitation in the region of the capillary and, to a lesser extent, by shearing of the sol stream by the alcohol stream.

The dispersed sol droplets were congealed to gel microspheres by the isoamyl alcohol and gradually settled into the tank 2. The valve 11 was left open, permitting gel microspheres and alcohol to drain onto a filter contained in a collection vessel. Subsequently, the microspheres were separated from the alcohol by displacement of the latter with argon gas. The microspheres then were dried to about 200° C. in a flowing stream of argon gas. The dried microspheres were fired, or calcined, by heating to 1,150° C. in alumina crucibles in an electrically heated furnace. The furnace atmosphere was argon during heating to 1,150° C., then argon—4 percent hydrogen for four hours at 1,150° C., and finally argon during cool down to below 100° C. The fired spheres were classified by screening, giving the following size distribution:

| Diameter (microns) | Weight (grams) | Percentage |
| --- | --- | --- |
| +62 | 139 | 21.0 |
| 53 to 62 | 60 | 9.0 |
| 44 to 53 | 136 | 20.5 |
| −44 | 328 | 49.5 |

The mean diameter of the fired spheres was 44 microns, corresponding to a mean sol drop diameter of 145 microns. The fired spheres had a particle density of 10.40 g./cc., a nitrogen adsorption surface area of 0.031 m.$^2$/g., a carbon content of 60 p.p.m. and an oxygen-uranium ratio of 2.0074. The percentage of product spheres having a diameter below 10 microns was low compared to the products obtained by processes utilizing other methods of sol dispersion.

EXAMPLE II

In this run (which corresponds to run No. 1 of table I) the nozzle 3 comprised a glass tube having an internal diameter of 0.059 inch. A No. 20 hypodermic needle was passed through the wall of the tube to extend 0.02 inch therein. Isoamyl alcohol containing no surfactant and having a viscosity of 2.5 centipoise was passed through the nozzle at 520 cc./min. $ZrO_2$ (1.3 M Zr) was passed through the needle at 7.6 cc./min. The Reynolds number of the alcohol the upstream of discharge end of the needle was 2,440.

The recovered gel microspheres were dried at room temperature, yielding unfired spheres having a mean diameter of 10 microns, corresponding to a sol drop mean diameter of 25 microns.

EXAMPLE III

In this run (which corresponds to Run No. 19 of table I) the nozzle 3 comprised a metal tube having an internal diameter of 0.156 inch; a No. 20 hypodermic needle extended through the tube wall and 0.05 inch to its interior. Isoamyl alcohol containing about 0.2 v/o "Ethomeen S/" and 0.04 v/o Span 80 (both identified in U.S. Pat. No. 3,290,122) and a viscosity of 2.5 centipoises was passed through the tube at a flow rate of 880 cc./min. Thorium oxide sol (2.7 M Th) was introduced through the needle (capillary) at a flow rate of 7.6 cc./min. The alcohol Reynolds number in the tube was calculated to be 1,520. The gel spheres were collected in a product receiver, blown dry of alcohol by air, dried in argon to 200° C., and fired in air to 1,150° C. The fired spheres were classified by screening, giving the following fractions:

| Diameter (microns) | Weight (grams) | Percentage |
| --- | --- | --- |
| >105 | 246 | 21.4 |
| 88 to 105 | 108 | 9.4 |
| 74 to 88 | 221 | 19.2 |
| 62 to 74 | 138 | 12.0 |
| 53 to 62 | 97 | 8.4 |
| 44 to 53 | 232 | 20.1 |
| −44 | 111 | 9.6 |

The mean diameter of the fired spheres was 73 microns, corresponding to a mean sol drop diameter of 175 microns.

Figure 3:
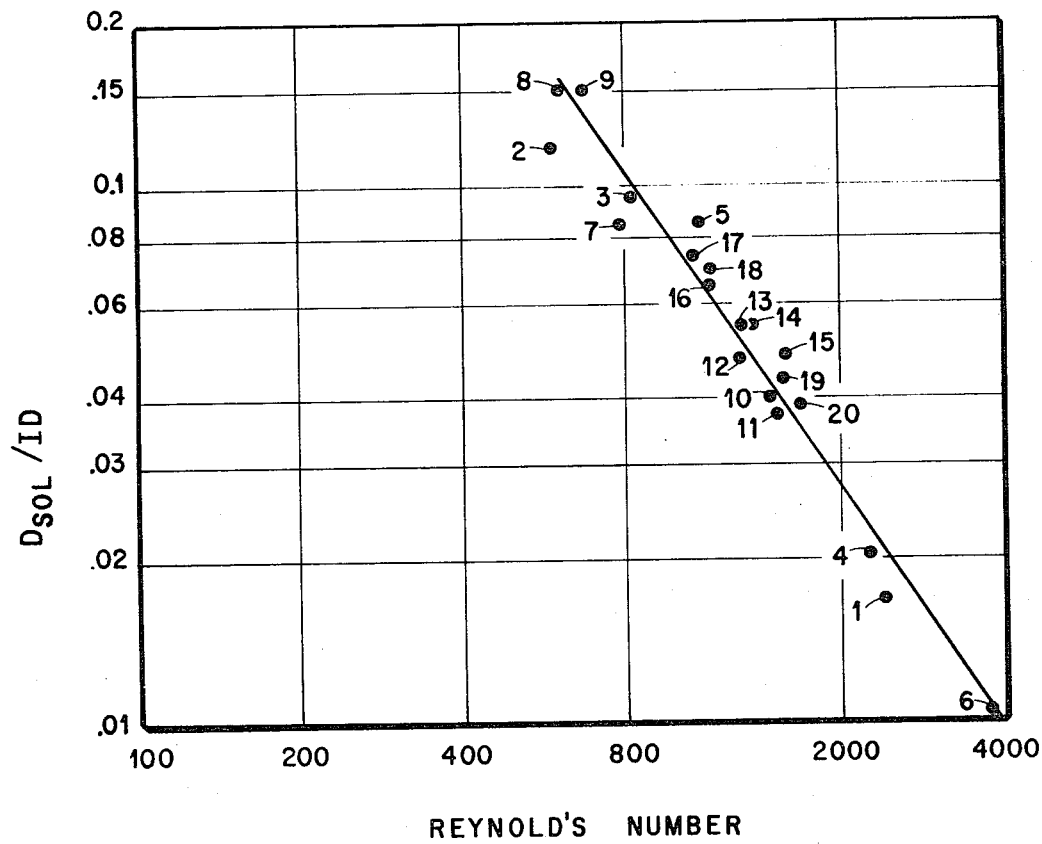
FIG. 3 is a graph correlating selected data obtained in runs conducted in accordance with this invention.

As mentioned previously controllability of the sol dispersion is of critical importance in the production of gel microspheres. In the subject method, the mean diameter of the dispersed sol drops can be controlled with relative ease by varying the flow rate of the organic liquid input to the nozzle 3. Varying this flow rate reproducibly varies the agitation effecting dispersion of the sol introduced through the capillary 4. Table I presents sol-dispersion data obtained with shear dispersers utilizing right-angle introduction of the sol through a projecting capillary and agitated flow adjacent to the capillary outlet. These data have been correlated in the following dimensionless equations:

$$D_{sol}/ID = K(G/F)^{0.1} Re^{11.5}$$

where $D_{sol}$ is the mean sol-drop diameter; $ID$ is the internal diameter of nozzle 3; $K$ is the constant 1,630; $G$ is the organic liquid flow rate, $F$ is the sol flow rate; and $Re$ is the organic liquid Reynolds number. The mean sol diameters shown in the table were back calculated from measurements of the diameters of the dried or fired microsphere products derived from the respective sol dispersions. The calculated values for the constant $K$ indicate the fit of the equation. FIG. 3 is a graphical correlation of the ratio $D_{sol}/ID$ and of Reynolds number for each of the runs listed in table I. The solid line represents the condition where $g/F=70$. The previously described example I, II, and III correspond to runs 14, 1, and 19, respectively, in table I.

products compared in the table have similar mean diameters, but those obtained by the subject method contain a much smaller proportion of spherical "fines." Referring to columns 1 and 2, for example, about 18 weight percent of the product produced by the paddle-agitator technique had a diameter smaller than 0.4 of the mean diameter whereas the corresponding figure for the subject method was about 3 weight percent. Visual observation indicates that there is an even greater disparity below 0.2 of the mean diameter.

TABLE II

|  | Paddle agitator method | Subject method | Paddle agitator | Subject method |
|---|---|---|---|---|
| Mean diameter, $d_{50}$, $\mu$ | 92 | 90 | 78 | 76 |
| Weight percent smaller than: |  |  |  |  |
| $0.8\ d_{50}$ | 42 | 30 | 38 | 28 |
| $0.6\ d_{50}$ | 30 | 13 | 26 | 11 |
| $0.5\ d_{50}$ | 24 | 7 | ~19 | ~4 |
| $0.4\ d_{50}$ | ~18 | ~3 | ~14 | <2 |

The inlet capillary 4 performs at least two important functions. First, it promotes localized agitation of the organic stream in the region of the capillary, even at Reynolds numbers as low as 500. Second, it serves as a means of introducing a sol stream of highly uniform configuration. That is, by means of the capillary the sol is introduced at a point spaced from the wall of the nozzle, so that little if any of the introduced sol is swept against or down the nozzle wall. It is preferable that the

TABLE I

| Run No. | Nozzle I.D. (cm.) | Alcohol flow, G (cm.³/min.) | Alcohol viscosity, $\mu$ (centipoises) | Sol flow, F (cm.³/min.) | Alcohol Reynolds Number | Mean sol diameter, $D_{sol}$ ($\mu$) | Calculated value of $K^1$ |
|---|---|---|---|---|---|---|---|
| 1 | 0.15 | 520 | 2.5 | 7.6 | 2,440 | 25 | 1,340 |
| 2 | 0.195 | 330 | 5.0 | 4.9 | 595 | 230 | 1,120 |
| 3 |  | 520 | 5.7 | 4.9 | 825 | 185 | 1,420 |
| 4 |  | 560 | 2.2 | 9.6 | 2,240 | 40 | 1,450 |
| 5 |  | 620 | 5.1 | 4.9 | 1,100 | 165 | 1,910 |
| 6 |  | 860 | 2.0 | 9.6 | 3,790 | 20 | 1,490 |
| 7 | 0.200 | 210 | 2.3 | 9.6 | 785 | 170 | 1,370 |
| 8 |  | 240 | 3.5 | 9.8 | 605 | 300 | 1,630 |
| 9 |  | 368 | 4.8 | 9.8 | 675 | 300 | 1,820 |
| 10 |  | 385 | 2.2 | 9.6 | 1,500 | 80 | 1,600 |
| 11 |  | 405 | 2.3 | 9.6 | 1,510 | 75 | 1,530 |
| 12 |  | 430 | 2.8 | 9.6 | 1,320 | 95 | 1,570 |
| 13 | 0.265 | 535 | 2.65 | 9.8 | 1,310 | 145 | 1,740 |
| 14 |  | 550 | 2.7 | 9.8 | 1,320 | 145 | 1,770 |
| 15 |  | 650 | 2.7 | 3.7 | 1,565 | 127 | 1,770 |
| 16 | 0.28 | 500 | 2.7 | 9.6 | 1,140 | 180 | 1,650 |
| 17 | 0.38 | 710 | 3.0 | 10.0 | 1,070 | 280 | 1,710 |
| 18 |  | 740 | 2.9 | 7.6 | 1,150 | 265 | 1,710 |
| 19 | 0.396 | 880 | 2.5 | 7.6 | 1,520 | 175 | 1,630 |
| 20 | 0.50 | 1,260 | 2.7 | 15.3 | 1,610 | 190 | 1,590 |

¹ Equation: $D_{sol}/I.D. = k(G/F)^{10.111} Re^{-5}$.

Referring to column 4 of table I, in those runs where the alcohol viscosity is listed as being in the range of 2.0 to 3.5 c.p.s. the organic liquid was isoamyl alcohol; in the remaining runs the organic was 2-ethyl-1-hexanol. The sols referred to in the table comprises various hydrous oxide compositions besides those identified above in examples I, II, and III. For example, in runs 17 and 18 the sol was $TiO_2$-C; in run 9, $UO_2$-C; and in runs 19 and 20, 2.7 M $ThO_2$.

The tabulated data demonstrate a good fit for the above-mentioned equation for a wide range of operations. As is shown clearly in FIG. 3, good control of the mean diameter of the sol is accomplished by varying the flow rate of the organic stream. The fired microspheres prepared from the various sol dispersions exhibited good uniformity, comparable to that obtained in the above-cited examples I, II, and III. This process has been used with still other sols to produce drop dispersions having mean diameters below –C; microns; these other sols include –C; following: $PuO_2$, $UO_2$-$PuO_2$, $HfO_2$-C, and $ThO_2$-UO An important advantage of this invention is that it can be used to produce fired microspheres products containing relatively small percentages of spheres with diameters much smaller than the mean diameter. This is illustrated in table II, below, which compares fired microsphere products obtained from gel microspheres produced by (a) the subject method, and (b) commonly employed paddle-agitator method. The capillary itself have as thin a wall as is consistent with structural integrity. The capillary permits the use of comparatively high organic flow rates without producing unacceptably large pressure drops in the nozzle 3.

If extremely small gel microspheres are desired, high organic flow rates can be employed to provide high Reynolds numbers adjacent the outlet of the capillary. For example, Reynolds numbers of about 10,000 can be employed to produce sol drop dispersions with a mean diameter of about 5 microns.

The foregoing examples are merely illustrative and are not to be understood as limiting the scope of our invention, which is limited only by the appended claims.

What is claimed is:

1. In a process for forming gel microspheres from sol droplets which comprises introducing through an inlet orifice a fine stream of an aqueous sol selected from the group of urania, thoria, zirconia, and plutonia into a stream of organic drying liquid to thereby congeal said sol droplets into gel microspheres, the aqueous sol stream being introduced into the organic stream at an angle to the direction of flow of said organic stream, the improvement comprising
   a. introducing said sol stream into said organic stream through a capillary extending transversely therein;
   b. maintaining the flow rate of said sol stream in the range of about 1 to 35 cc./min.; and c. impinging said organic stream on said capillary at a flow rate in the range of 200 to 2500 cc./min. to promote agitated flow of said organic stream in the region of said capillary, thereby exerting dispersing forces on the introduced sol to form a highly uniform dispersion thereof having a mean drop diameter in the range of about 5 to 300 microns.

2. The method of claim 1 wherein said sol stream is introduced into said organic stream in a direction substantially normal to the direction of flow of said organic stream.

3. The method of claim 1 wherein the major axis of said inlet capillary is substantially normal to the direction of flow of said organic stream.

4. The method of claim 1 wherein said organic stream comprises isoamyl alcohol.